United States Patent [19]

Haynes

[11] Patent Number: 4,552,537
[45] Date of Patent: Nov. 12, 1985

[54] MARINE PROPULSION DEVICE WITH ENGINE HEAT RECOVERY SYSTEM AND STREAMLINING HULL CLOSURES

[76] Inventor: Hendrick W. Haynes, FID&D, P.O. Box 66152, Seattle, Wash. 98166

[21] Appl. No.: 50,199
[22] Filed: Jun. 20, 1979
[51] Int. Cl.⁴ .............................................. B63H 11/08
[52] U.S. Cl. ..................................... 440/47; 114/151; 114/197; 137/845; 137/855
[58] Field of Search ................. 60/221, 222; 114/151, 114/197, 198, 183 R, 183 A, 184, 185, 284; 115/11-16; 440/38-47, 88, 89; 137/845, 855; 165/44; 251/61.1, 61.2; 239/602, 230, DIG. 7

[56] References Cited

U.S. PATENT DOCUMENTS

| | | | |
|---|---|---|---|
| 776,416 | 11/1904 | Norden | 440/38 |
| 2,644,663 | 7/1953 | Klingler | 137/845 |
| 2,696,077 | 12/1954 | Goodman | 60/222 |
| 2,990,797 | 7/1961 | Moeller | 114/183 R |
| 3,011,468 | 12/1961 | O'Gara | 137/855 |
| 3,250,219 | 5/1966 | McCarty et al. | 137/845 |
| 3,273,333 | 9/1966 | Roulund | 115/15 |
| 3,315,897 | 4/1967 | Stout | 239/230 |
| 3,326,456 | 6/1965 | Le Blanc | 137/845 |
| 3,476,070 | 11/1969 | Austen | 165/44 |
| 3,481,297 | 12/1969 | Mantle | 114/284 |
| 3,624,737 | 11/1971 | Keller | 440/47 |
| 3,906,886 | 9/1975 | Elger | 440/38 |
| 3,943,876 | 3/1976 | Kiekhaefer | 115/12 R |
| 4,056,073 | 11/1977 | Dashew | 115/12 R |
| 4,113,183 | 9/1978 | Stuart | 239/602 |
| 4,138,963 | 2/1979 | Thompson | 114/151 |
| 4,239,013 | 12/1980 | Haynes | 440/89 |
| 4,290,455 | 9/1981 | Honda et al. | 137/855 |

FOREIGN PATENT DOCUMENTS

| | | | |
|---|---|---|---|
| 347591 | 3/1905 | France | 115/15 |
| 1464224 | 12/1966 | France | 115/11 R |

Primary Examiner—Galen L. Barefoot
Assistant Examiner—Thomas J. Brahan

[57] ABSTRACT

A Marine Jet Propulsion System for use as an inboard engine for boats is herein described. An engine or motor means is attached in a driving relationship to a pump and thrust output apparatus. Heat generated by and rejected by the engine or motor is passed into the pump base for dissipation into the outputted jet thrust stream. Air and/or exhaust gas from the engine is ejected around the jet output stream to reduce against-the-hull turbulence and jet stream or thrust energy losses. Streamlining hull closures for the jet pump intake and output ports are provided to reduce system hull drag when not in use and to limit marine organism growth inside the pump.

11 Claims, 11 Drawing Figures

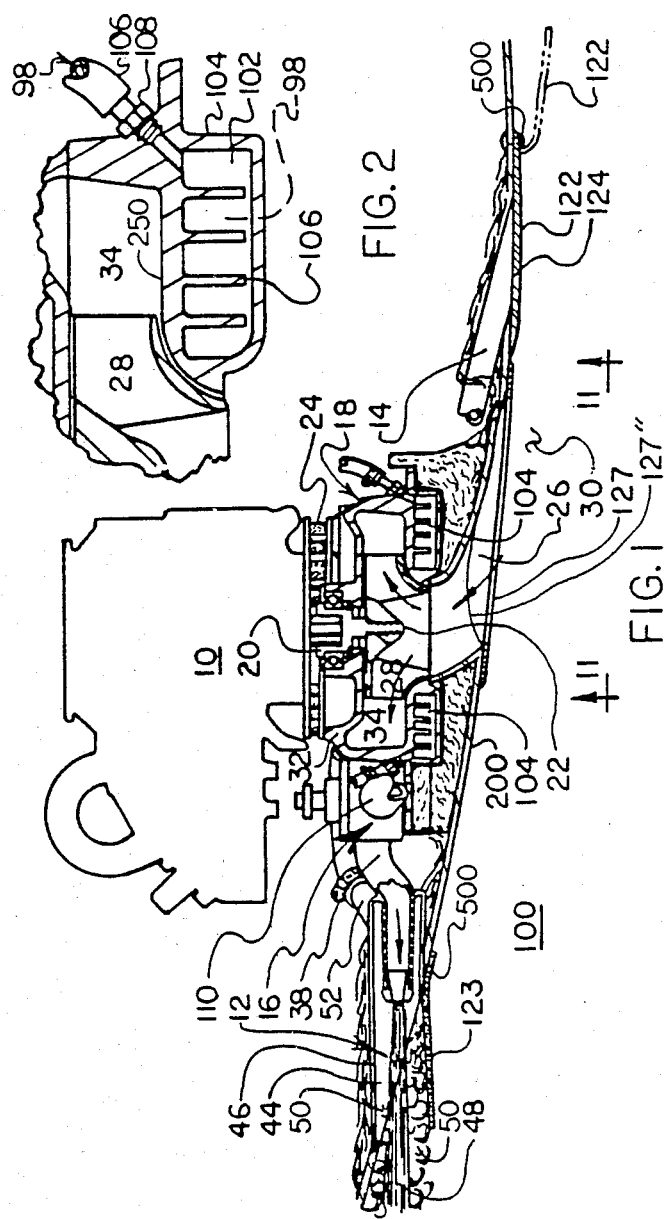

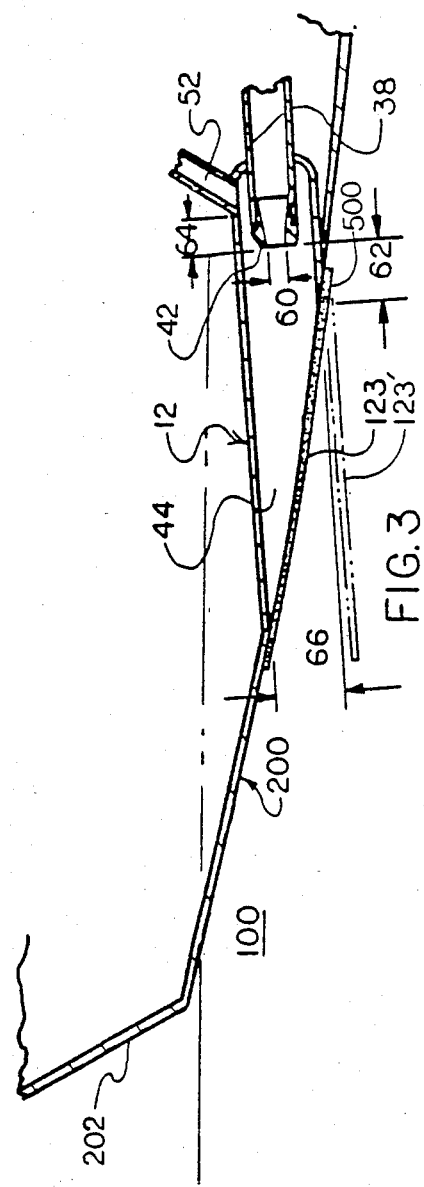

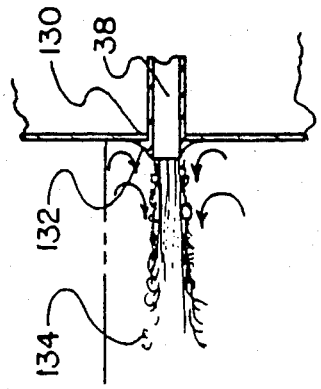
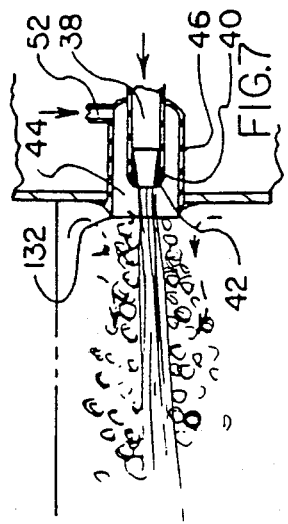
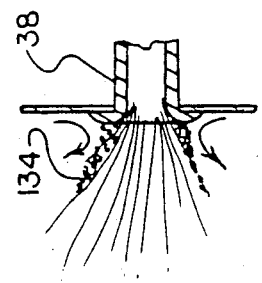

MARINE PROPULSION DEVICE WITH ENGINE HEAT RECOVERY SYSTEM AND STREAMLINING HULL CLOSURES

BACKGROUND OF THE INVENTION

Inboard auxiliary or main drive engines which use directed water for propulsive power such as propellers and marine jets develop thrust by transfer of momentum from the ejected water to the boat. With propeller drives and submarine discharging jets, the ejected water transfers a significant percentage of its thrust back into the hull, called a "thrust deduction factor," as a result of a negative pressure turbulent wake created largely against the aft portion of the hull. The remaining thrust, or actual propulsive thrust, acts to drive the hull into equilibrium with hull resistance as the vessel accelerates to speed. The invention herein described provides a means wherein heat from the motor or engine is used to raise the temperature of the exterior boundry layer water used for thrust in a jet pump. Also, the engine or motor exhaust gases are vented around the outside of the ejected jet stream. The gases around the jet stream, as the stream leaves the boat hull at high speed, expands much easier than the jet stream, therefore substantially reducing the thrust deduction factor, and increasing net submarine discharging jet efficiency. The increase in water temperature over ambient water by the warmed pump casing increases the propensity of air to come out of solution in the jet stream, and lowers the energy required to cause the jet stream to "supercavitate" as it leaves the jet stream nozzle. This increases pump efficiency proportional to the drop in energy required the lost in passing the jet stream into supercavitating flow. To reduce parasitic hull drag and deterioration of jet efficiency by marine life growing inside the jet pump, streamlining and sealing hull closures are incorporated. These principles hold for use of the system as a conventional marine auxiliary and power plant, as well as a thrusting device such as bow and stern thrusters.

OBJECTS AND ADVANTAGES

It is an object of this invention to provide a simple means whereby the marine engine is continuously cooled with fresh, non-corrosive coolant.

It is an object of this invention to provide a means whereby heat rejected by the engine or motor may be recovered in the jet pump propulsive fluid and aid in providing thrust.

It is another object of this invention to provide a means whereby the turbulent drag associated with "thrust deduction" may be substantially reduced and engine exhaust energy recovered.

It is another object of this invention to provide a thrust port means which streamlines the jet output and input ports and renders the hull drag free and reduces marine growth inside the pump when the jet pump is not in use.

It is a further object of this invention to provide a marine propulsive device and bow thruster with lower energy losses than the marine jet pumps currently employed in the art with submarine or underwater discharging nozzles.

These and other objects and advantages shall become apparent from the following description taken in conjunction with the accompanying drawings in which:

THE DRAWINGS

FIG. 1 is a cross-section of propulsion unit taken on line 1—1 of FIG. 9.

FIG. 2 is a detail cross-section of the motor heat exchanger and jet pump combination for the transfer of rejected heat into the pump jet stream as a prefered embodiment.

FIG. 3 is a detailed cross-section of the jet output around which atmospheric gas and/or engine exhaust is introduced to surround the output jet stream.

FIG. 4 is an output jet nozzle of an auxiliary drive penetrating through the boat hull and exhibiting an extended edge to aid supercavitating flow.

FIG. 5 is a cross-section of an output jet nozzle of a bow thruster with an extended lip to aid the output flow of the jet in passing into the supercavitating flow regime.

FIG. 6 is a cross-section of a conventional bow thruster nozzle with arrows indicating the direction of fluid flow and the dispersement of thrust lines.

FIG. 7 is a cross-section of an output nozzle for the bow thruster utilizing air and/or engine exhaust as a surrounding fluid for the jet output thrusting water stream.

SPECIFIC DESCRIPTION OF THE INVENTION

Figure 8:
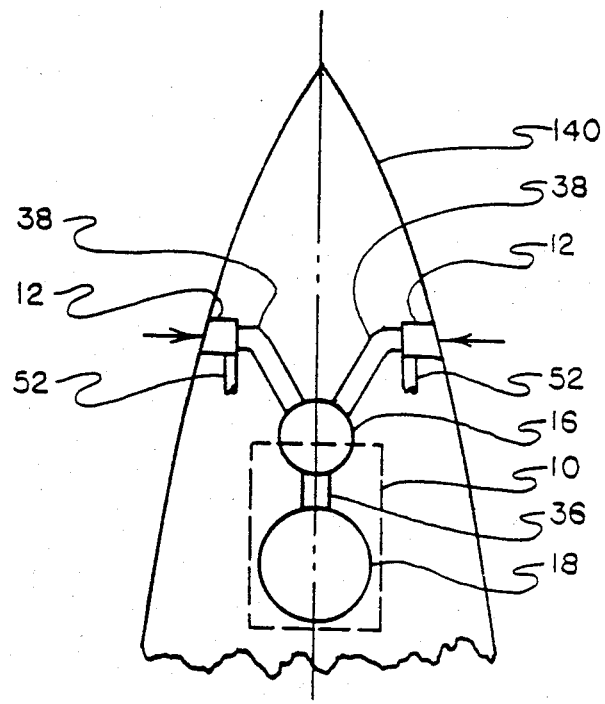
FIG. 8 is a plan view of the mechanical-hydraulic layout of the bow thruster application of the propulsion apparatus.

The propensity of a moving fluid to follow a curved surface is well known in the art, and its effects explored in such apparatus as stream tubes, lifting bodies (wings), etc. Work by Bernoulli, Taylor, Coanda and others on the utilization of high speed jet streams to create lift is legend in this regard. In the marine art, thrust generating output streams are generally discharged underwater in displacement type boats. The discharge of water away from the boat in the general proximity ahead or forward of the transom will cause, depending on the fineness of the vessel stern and the water velocity, the ejected fluid to follow the curvature of the hull. The disruption of this straight flow ejection patten from its normal course requires work, this being taken from the vessel. Examples of this in a displacement boat is the "squatting" in the stern caused by wave phenominon and the propellers low pressure field adjacent to the stern as the vessel increases speed. In the art, this "thrust relation" with the vessel exists roughly stated as $$\text{Thrust}_{True} = (1 - D_T)\left[\cos\theta_s\left(\frac{\phi}{2} A_p(V_1^2 - V_e^2)\right)\right]$$

Where:
$A_P$ = Propeller Disc area $\pi/4\ D^2 FT^2$ or $M^2$ or jet output cross-sectional area.

B = Breadth of hull relative to shaft or jet output centerline and mean plate line at midship section, in feet.

$D_T$ = Taylor thrust deduction valve based on block coefficient and may be calculated:

$$\text{Block Coef.} = C_b = \frac{\text{Immersed Volume}}{L \times B \times D_v}$$

Thrust deduction D then equals = ( for a single screw or jet propulsion submarine discharging pump)

$D_T = 0.375 \, C_b - 0.0375$ (over $C_b$ range of 0.5 to 0.9).

$D_v$ = Mean draft of hull relative to shaft or jet output centerline and mean plate line at midship section, in ft.

L = Length between hull perpendiculars, in ft., relative to propeller shaft or jet output centerline.

$V_1$ = Exit velocity in Ft./Sec. or M/Sec. of propeller wake or jet output.

$V_e$ = Advance velocity in ft./sec. or M/Sec.

$\theta_s$ = Propeller shaft centerline of jet output angle relative to vessel waterline.

$\phi$ = Mass density of water (1.94 fresh water, 1.99 salt water British; 102 fresh water, 104 salt water, metric).

It is apparent that the free propeller thrust [$\cos \theta_s$ ($\phi/2 \, A_p(V_1^2 - V_e^2)$)] is radically affected by the Taylor correction factor $(1 - D_t)$. The Taylor correction factor varies with the Block Coefficient. Note that $D_t$ can go from a Thrust Subtraction factor of 15% to 40% of the propulsion systems free thrust lost to the stern, or upwards toward and beyond 50% lost into the sides of a vessel (in the bow thruster case) as unusable eddy current losses. The Haynes invention, with the controlled interjection of air, allows the ejected fluid to follow a straight path away from the curvature of the hull. Thus momentum transfer losses are minimized.

In C. B. Cox et al (U.S. Pat. No. 3,288,100) a tapered venturi is proposed to mix air with the marine jet output stream through a helical stator. In W. R. Christensen (U.S. Pat. No. 3,188,997) a high velocity stream of water is passed through a mixing venturi to mix air or gases with the output jet stream. Although in both the above cases some of the gases entrained in the jet output is available for expansion on the outside of the jet stream and reducing hull suction, a significant expansion of the jet stream occurs, reducing thrust, as a direct result of the jet stream inducing viscous shear in surrounding fluid and inducing a negative pressure wake on the body from which the high speed thrust stream is leaving ("Coanda Effect").

The heretofore described system expressed as an auxiliary drive internal to and mounted to a hull of displacement character consisting of an engine or motor 10, a forward thrust output portion 12, a reverse thrust output portion 14, a thrust direction selector valve 16 and a jet pump 18. Engine or motor 10 is connected to jet pump 18 (whereby fluid is accelerated by impeller blade lift and centrifugal force) by a coupling 20 on the impeller shaft 22. Engine 10 is mounted on the pump 18, in the prefered embodiment, by flexible motor mounts 24. Pump 18 consists of a water intake region 26 directed into or toward the impeller 28. Impeller 28 accelerates the intake water 30 through the pump casing 32 and into the pump water discharge passageway 34. Water 30 is accelerated and a pre-rotational or rotating moment introduced in the water picked up into the impeller eye, in another embodiment (not shown) by water prewirling static vanes in the pump intake, and are redirected by the pumps diffuser vanes, also mounted statically. These vanes also aid in heat dissipation from the heat exchanger, as later elaborated on.

Other known pump forms, such as staged mixed and axial flow pumps, may be incorporated into the invention without departing from the spirit and intent of the invention.

The water expressed out of pump 18 through passageway 34 is directed under pressure by a connecting means 36 or passgeway 36 to thrust directional control valve 16. In the forward thrust direction mode, water at high velocity is ejected out of valve 16 into thrust tube 38. Thrust tube 38 terminates in a conically tapered nozzle 40 directed away from the vessel propulsion direction. Tapered nozzle 40 has a backward radiused or sharp upped surface 42 to allow the gases 50 in the jacketing region 44 of tube 46 to cleanly accelerate and surround ejected expressed thrust stream 48. A jacketing region 44 is recessed into hull bottom 200 at an oblique angle relative to hull bottom 200. Gases 50 are directed into jacket 44 by exhaust tube 52 from engine or motor 10 up to a pressure of 3 atmospheres absolute or may be drawn from an ambient pressure air supply. As the Jet stream 48 is discharged, through a penetration in the hull, into the water surrounding the vessel 100, it is commonly found in the art that a suction is created against the hull. This hull suction is relieved by the low viscosity and easily expanded air and/or exhaust gases directed by jacket 44, e.g. the air or gas flowing onto and along hull bottom 200 and around said jet stream 48. Preferably (see FIG. 3) the shortest length jacketing region 44 should be behind the end of most rearward extent 62 to surface 42 is dead flush or no ($\phi$) nozzle inside diameter 60, with the recommended length no more than five (5) nozzle diameters 60, with one (1) to three (3) yielding good results. The jacket 44 inside diameter should have a minimum of one and one half (1.5) times the nozzle 60 cross sectional area, but should not be any greater than six (6.0) times the output nozzle 60 cross-sectional area. Generally area ratios within 2.0 to 3.5 yield good results. The entrance tube for gas flow introduction should be no less than one (1) diameter 60 from end plane established by nozzle 40 end, although the tube can be located closer with useable results.

The pump 18 is heated by motor or engine 10 rejecting heat in and about the impeller casing region 250 and thereby acts as an engine or motor heat exchanger. Pump efficiency is increased through the heating of a thin film of water flowing over the pump casings interior volume. The heating of this thin boundry layer of water lowers its viscocity and brings air out of solution, causing this fluid to break into supercavitating turbulent flow at a lower energy loss level than if this boundary layer would not be heated. Lower pump casing internal "skin" friction losses are the result, increasing pump efficiency. The pump 18 is heated by liquid at a temperature above the water temperature of water 100 being injected into a finned and labyrinthine passageway 102 in sealed chambers 104. Hose 106 passes the heated engine water 98 through fitting 108 into passageway 102. The heated water 98 passes under and, as application permits around and over the pump and through fins 106. The casing walls conduct heat into the surface lining the interior of the marine jet pump. The cooled engine cooling water 98 leaves passageway 102 through line 110 whereon water 98 is returned via convection or coolant pump to cool engine 10.

Figure 10:
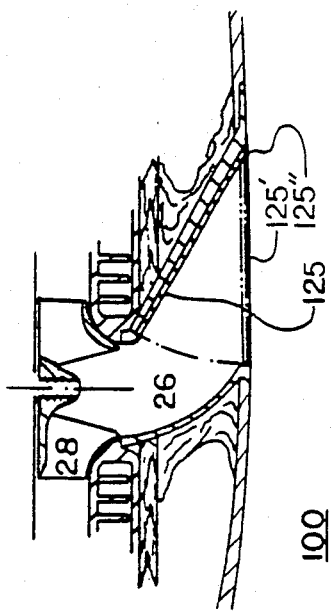
FIG. 10 is an alternate pump intake configuration employing a butterfly valve opened by pump intake pressure.
Figure 11:
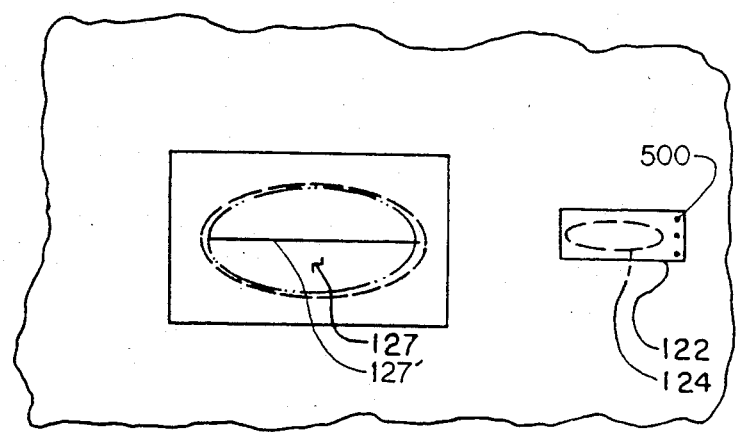
FIG. 11 is a bottom view of the pump intake of FIG. 1 incorporating a thin rubber closure and shown engine off (closed).

When valve 16 is put in the thrust reverse mode, water 30 is passed into reverse tube 120 whereon the fluid is routed ahead of the pump intake and discharged as a thrust stream 48. A thin flexible material, such as a rubber of low durometer and with a specific gravity less than 1 (allowing it to "float" closed when the engine is turned off), flap 122 is placed over the reverser tube to streamline reverser thrust output port 124 when not in use. A flap 123 over the forward thrust port made by tube 12 maybe similarly provided with equal streamlining and marine biostatic results. When reverse thrust is in use, flap 122 is blown open by the thrust stream and caused to rotate about an attachment by fastening means point 500 and reverse thrust is created. When boat moves forward, flap 122 is caused by water flow about the hull to close flush when jet is off. When forward thrust is in use, flap 123 is blown open and forward thrust is created. In FIG. 10a flush closing intake valve 125 is provided such that when the propulsion jet is turned off and therefore no longer drawing intake water into the pump, the pump intake is closed off by valve gate 125, rotating from position 125 to 125' about a fastening point or hinged point 125. This reduces the boat or vessel hull drag when under sail (sailboard case) and prohibits the intrusion of marine life into the pump. A butterfly type valve 125 is prefered, although a slitted (along a longitudinal line parallel with direction of vessel travel 127') flexible thin rubber closure 127 fixed all around the edges (see FIG. 11 and FIG. 1 and the drawn open outline of slit 127') to the boat bottom (and opened by pump intake suction) may be used. Other known flush closing valves, such as sliding or gate valves, may also be used. NOTE: If the thrust loss is critical in the reverse direction, a nozzle similar to nozzle 12 may be incorporated in the design.

In FIG. 4 a supercavitating nozzle not utilizing a gas jacket around the thurst output stream 48 is shown. A lip 126 is extended beyond boat hull bottom 200 by about 20% to 100% of tube 38's inside diameter. The outside of the tube is preferably radiused with the hull. This allows a turn-around region for vortexing fluid flow and reduces the nozzle area subjected to supercavitating shear. A similar nozzle 130 is shown in FIG. 5 as a cross-section, in a bow thruster application. Lines of flow indicate the water 100's vortexing and energy deduction action. A cavitating region 132 draws air out of solution with the water and reduces thrust deduction. However, energy must be lost from the jet stream and momentum transfer diffused due to stream expansion and loss of the energy needed to "pull" air out of water solution and to cavitate or boil the water through a sudden pressure drop adjacent to the hull. In FIG. 7 a bow thruster jet output nozzle utilizing the same preferred thrust output principles as in FIGS. 1 and 3 is shown. However, the thrust deduction factor is less than 5% compared to FIG. 6, e.g., a conventional thruster thru-hull at about 40 to 50%. The relative proportions are the same as for thrust output tube 12. The taper within nozzle 40 should be less than 6° and not have steps in going to conformity with tube 38.

In FIG. 8, a preferred plan-view relationship is shown supplying side thrust to maneuver a bow 140 of a vessel or ship (arrows show thrust direction). Valve 16 is then 'Y' shaped and selects between port and starboard thrust. Air is injected at lines 52.

Figure 9:
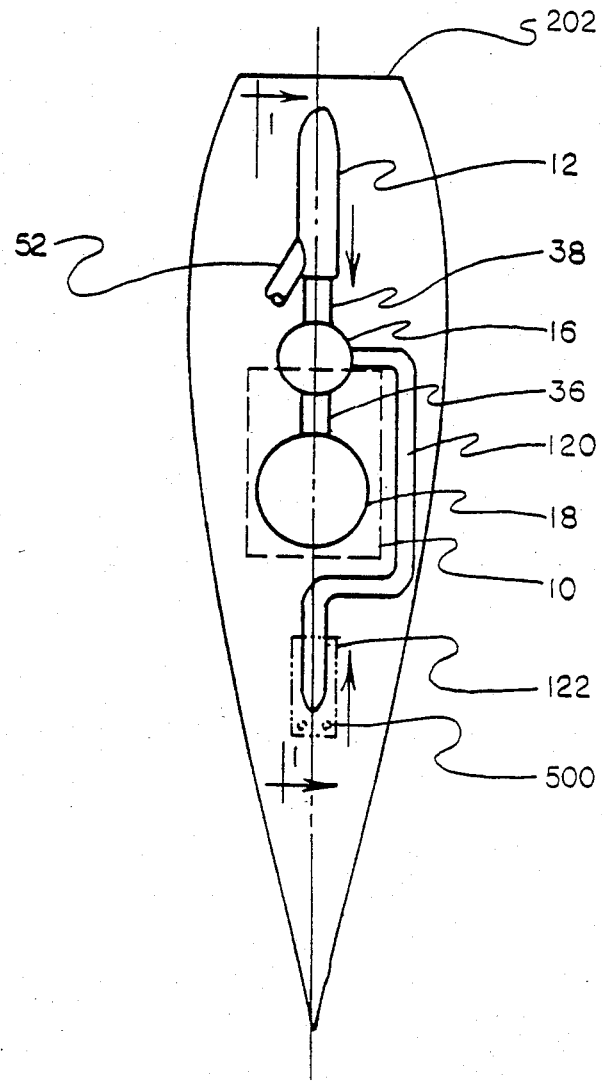
FIG. 9 is a plan view of the mechanical-hydraulic layout of the jet auxiliary drive for marine use.

FIG. 9 shows a preferred plan-view relationship for the invention used as a marine auxiliary. Steerage as a marine auxiliary is provided by a steering rudder located aft of the jet output, preferable greater than 30 inches. In neutral, the thrust valve 16 directs water flow equally out both thrust ports, and proportionally divides thrust as it is moved from 100% forward (or port) to 100% aft (or starboard).

While a specific embodiment of an improved marine propulsion motor and propulsion system associated therewith have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a boat propelled directionally by an inboard marine water jet propulsion system for boats supported by the boyant property of water when said jet is operating, said boat comprising:
   (a) A boat;
   (b) A motor located therein;
   (c) A water pumping means coupled operably to said motor;
   (d) Said water pumping means afixed to said boat to allow the drawing of fluid (100) from the outside of the boat and through an intake region (26) into the jet pump and
   (e) By the operation of said pumping means the water is discharged through a defined pathway to allow the expression of said drawn fluid through a nozzle to the outside of said boat where the result of said expression of the fluid through the nozzle is the propulsive reaction of the boats travel apposed to the direction of said fluid expression;
wherein the improvement is comprising:
   (1) Said nozzle means being operably connected by a thrust transmission tube means (38) to a pumping means (18) including an impeller casing for housing a water impelling means (28) therein;
   (2) Said water impelling means pumping water (100) at a rate sufficient to induce turbulent flow of the water when it is pumped in a passageway (34);
   (3) Said passageway (34) including means for heating its interior surface to a temperature above that of the water (100) being drawn in by said pumping means (18), said means for heating being in thermal communication with said impeller casing;
   (4) Wherein the energy lost by a driving motor operatively connected to said pump in transporting a water stream through said pump is reduced by the effect of increasing the boundry layer water temperature, thus lowering the pressure change necessary to draw gas out of solution adjacent to said boundry when said water is in a turbulent flow condition.

2. An inboard marine water jet propulsion system of claim 1, wherein said nozzle penetrates the boats bottom (200) at an oblique angle for expressing a fluid therethrough into the water surrounding said boat, said expressed fluid providing thrust without extending appendage from said boat bottom (200) for the movement of said boat.

3. An inboard marine water jet of claim 2 further comprising a jacketing region (44) around said nozzle (40), said jacketing region being charged with a continuous supply of gas by a supply means (52), such gas surrounding the expressed thrust stream as a layer (50), wherein the gas surrounding (50) the stream (48) acts as a boundry layer means (50) to reduce the negative pressure wake (Taylor Wake) exerted against said hull in the absence of said layer (50).

4. An inboard marine water jet of claim 2, further comprising a jacket region in-line and surrounding the nozzle (40) and extending along the flow of the jet stream (48) expressed from the nozzle face surface (42), the distance between the nozzle face (42) and the first projected contact with the vessel surrounding water (100) being between zero and five nozzle diameters.

5. A unit of claim 4, where distance between said nozzle face (42) and said first projected contact is from 1 to 3 (three) nozzle diameters (60).

6. An inboard marine water jet of claim 2, further comprising a jacket region having a cross sectional area ratio of 1.5 to 6 (six) times the nozzle (60) cross sectional area.

7. A unit of claim 6, further comprising said jacket region (44) having a cross sectional area ratio of from 2.0 to 3.5 times nozzle (60) cross sectional area.

8. A unit of claim 2, where the exterior of said nozzle region is closed off by a flexurally attached flap (122 and 123) and said flap is attached along a single edge (500) by a fastening means, and this edge being oriented forwardly in the direction of the vessels dominant direction of travel, wherein the forward movement of said boat will cause said flap to rotate about said fastening means at edge (500) and cause the substantially flush closure of said flap (122 and 123) against the boat bottom (200) and the laying over of said nozzle (40), and upon expressing a thrust stream (48) said flap (122 and 123) will be rotated rearwardly against and about said fastening means at edge (500), allowing said thrust stream (48) to pass by said flap (122 and 123).

9. A unit of claim 8 where flap (122 and 123) has a specific gravity less than one (1).

10. A unit of claim 8, where the intake region (44) is sealed by a thin flexible rubber closure (127), the rubber closure having a longitudinal slit (127') therethrough, where upon operating said pump (18) and creating a pressure differential between the water (100) outside of the boat and the intake region (28) of the pump (18), the thin rubber closure (127) is drawn in along slit (127') into the intake region (28) of pump (18) and allows the water to pass therein, and upon turning off said pump (18) said flexible rubber closure (127) shall resume its normal shape and close off said intake.

11. A unit of claim 8 where the intake region (44) is closed by a butterfly valve door (125) rotateably attached at its leading edge (125") on the forward portion of the pump intake region (28) and flush fitting with boat bottom (200), such that in response to the creating of a differential pressure inside the intake region (28) relative to the water (100) outside of boat bottom (200) by the operation of pump (18), the valve will rotate from its flush closed position (125') to its streamlined open position (125) within intake region (28), and whereon stopping said pump operation the differential pressure will cease and valve will return to its flush closed position (125') with respect to the boat bottom (200).

* * * * *